(12) United States Patent
Emmons et al.

(10) Patent No.: US 8,990,915 B2
(45) Date of Patent: Mar. 24, 2015

(54) LOCAL DATA APPLIANCE FOR COLLECTING AND STORING REMOTE SENSOR DATA

(75) Inventors: Stephen P. Emmons, Carrollton, TX (US); Jeffrey O. Smith, Dallas, TX (US); Richard Burtner, Broadlands, VA (US); Henry S. Rosen, Dallas, TX (US)

(73) Assignee: Numerex Corp., Atlanta, GA (US)

( * ) Notice: Subject to any disclaimer, the term of this patent is extended or adjusted under 35 U.S.C. 154(b) by 116 days.

(21) Appl. No.: 13/435,231

(22) Filed: Mar. 30, 2012

(65) Prior Publication Data
US 2012/0254974 A1  Oct. 4, 2012

Related U.S. Application Data

(60) Provisional application No. 61/470,297, filed on Mar. 31, 2011.

(51) Int. Cl.
  *G06F 21/00* (2013.01)
  *H04L 29/06* (2006.01)
  *H04L 29/08* (2006.01)

(52) U.S. Cl.
  CPC .............. *H04L 63/02* (2013.01); *H04L 67/12* (2013.01)
  USPC ................... 726/11; 726/2; 726/12; 709/217

(58) Field of Classification Search
  USPC ................................................ 726/11–12
  See application file for complete search history.

(56) References Cited

U.S. PATENT DOCUMENTS

| | | | | |
|---|---|---|---|---|
| 7,440,558 B2 * | 10/2008 | Heilmann et al. | ............ | 379/189 |
| 7,752,301 B1 * | 7/2010 | Maiocco et al. | ............ | 709/224 |
| 7,877,783 B1 * | 1/2011 | Cline et al. | ........................ | 726/2 |
| 2003/0140141 A1 * | 7/2003 | Mullen et al. | ................. | 709/225 |
| 2004/0019656 A1 * | 1/2004 | Smith et al. | ................... | 709/217 |
| 2004/0255167 A1 * | 12/2004 | Knight | ......................... | 713/201 |
| 2006/0095199 A1 * | 5/2006 | Lagassey | ..................... | 701/117 |
| 2006/0215833 A1 * | 9/2006 | Mahoney et al. | ......... | 379/265.02 |
| 2008/0007764 A1 * | 1/2008 | Zhang et al. | .................. | 358/1.15 |
| 2009/0058629 A1 * | 3/2009 | Friar et al. | ..................... | 340/506 |
| 2012/0306662 A1 * | 12/2012 | Vosch et al. | ............. | 340/870.07 |

* cited by examiner

*Primary Examiner* — Morshed Mehedi
(74) *Attorney, Agent, or Firm* — Bell Nunnally & Martin LLP; Craig J. Cox

(57) ABSTRACT

A system for providing local access by means of a local data appliance to data collected from remote monitors and sensors is described. The system includes a plurality of remote monitors and sensors, the remote monitors and sensors reporting data over a wide area communications network, and a data collection center receiving the data from the remote monitors and sensors, the data collection center operable to process the data and generate customer defined reports based on the data. A local data appliance placed in the customer's network operates to receive the data from the data collection center, and to process the customer data, generate reports based on the data and send instructions to the remote monitors and sensors. The appliance resides behind the customer's firewall but is separate from the customers network and data center equipment.

18 Claims, 3 Drawing Sheets

LOCAL DATA APPLIANCE FOR COLLECTING AND STORING REMOTE SENSOR DATA

CROSS REFERENCE TO RELATED INFORMATION

This application claims the benefit of U.S. Provisional Application Ser. No. 61/470,297, filed Mar. 31, 2011.

TECHNICAL FIELD

The present disclosure is directed to the storage of data collected from multiple remote sensors, and more particularly to an appliance resident in the owner's network that collects and stores data from geographically dispersed remote data sensors.

BACKGROUND OF THE INVENTION

Many companies have an interest in collecting and analyzing data gathered from remote sources. Those companies may have fleets of vehicles that they wish to monitor and direct, may have products out at remote location that they would like to gather information on and data from, such as vending machines, cell tower installations, etc. Their business may depend on retrieving and analyzing remote data such as traffic conditions, or weather conditions, or may have any other use for remotely collected data. There are manufacturers and distributors of equipment and sensors that allow those companies to have access to the desired data. In many instances, those manufacturers will deploy resources required to monitor and collect data from the remote sensors and may parse and analyze that data for the customer, providing the customer with reports to summarize the data of interest. In those cases, the service provider will store the company's raw data and provide access to the reports and data.

In many instances, this system is not ideal for the customer. For a variety of reasons, the customer may not want the data stored outside of the company network, as that data could be compromised, hacked or simply unavailable at times. At the same time, the company may not want a service provider to have the required access to continually update information on the company's servers and data centers, as would be required to continually monitor the information coming from the remote devices. Further the company may not have the analytical capabilities and technologies to parse and analyze the data to put it into a useful format.

What is required is a mechanism that is capable of receiving data from remote monitors or sensors and resides in the customer's network but is isolated from the rest of the company's network and equipment.

BRIEF SUMMARY OF THE INVENTION

In preferred embodiments an appliance for receiving and storing customer data collected from remote monitors and sensors is described. The appliance includes one or more network interfaces, the network interfaces operable to allow the appliance to receive data from and send data to the remote monitors and sensors, at least one processor connected to the one or more network interfaces, the processor operable to process the customer data and to control operation of the appliance, and a data storage medium connected to the processor, the data storage medium storing the customer data. The appliance receives the customer data collected from the remote monitors and sensors, where the customer data is being sent from a data collection center outside of the customer's network. The appliance processes the customer data, generate reports based on the data and sends instructions to the remote monitors and sensors. The appliance resides behind the customer's firewall but is separate from the customers network and data center equipment.

In other preferred embodiments a system for providing local access to data collected from remote monitors and sensors is described. The system includes a plurality of remote monitors and sensors, the remote monitors and sensors reporting data over a wide area communications network. A data collection center receives the data from the remote monitors and sensors, and processes the data and generate customer defined reports based on the data. A local data appliance in the customer network receives the data from the data collection center, and processes the customer data, generate reports based on the data and send instructions to the remote monitors and sensors. The appliance resides behind the customer's firewall but is separate from the customers network and data center equipment.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
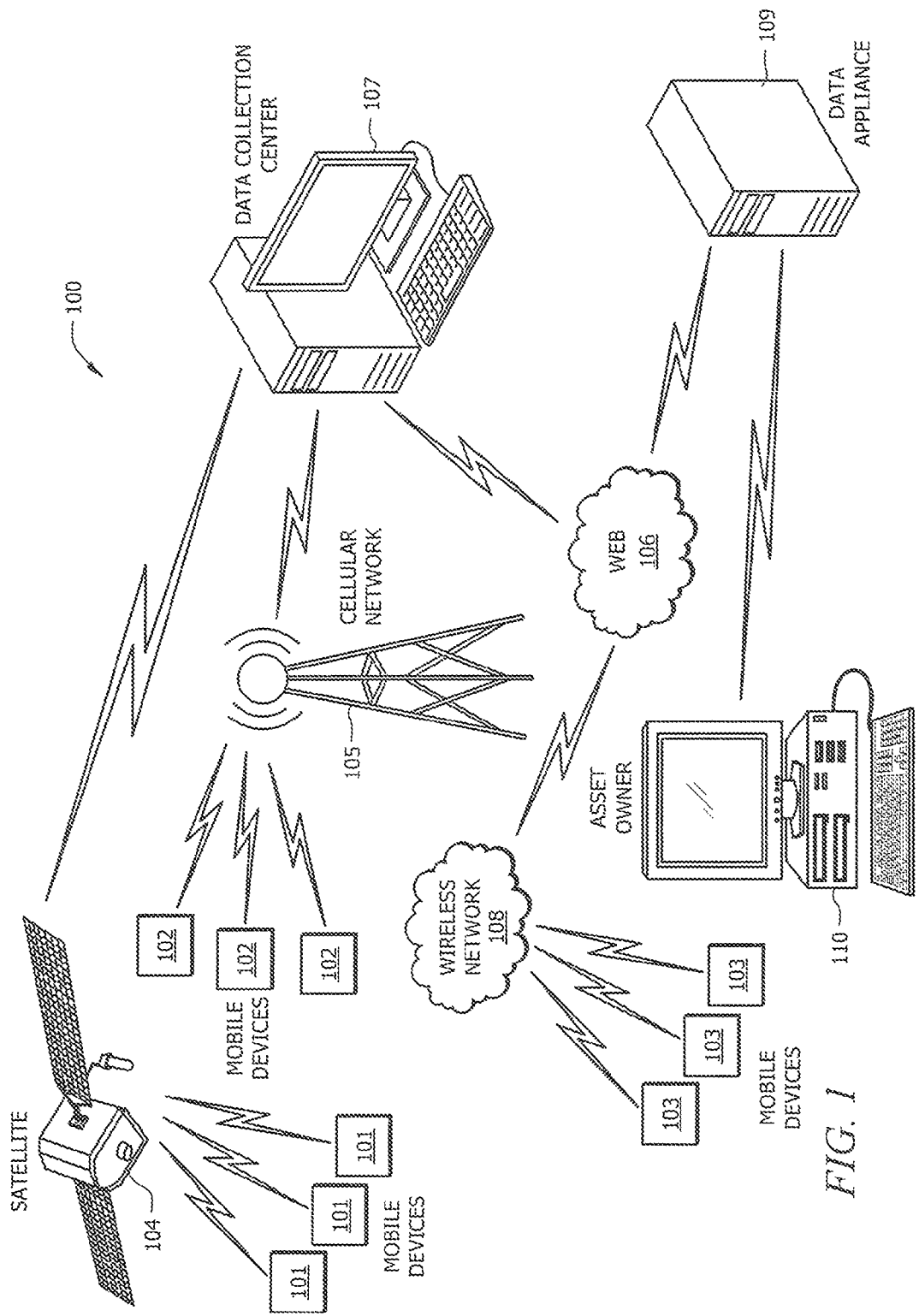
FIG. 1 is a system diagram of an embodiment of a remote data collection system utilizing a local data appliance according to the concepts described herein.

Referring now to FIG. 1, an embodiment of a system 100 for collecting remote data and storing that remote data in a local appliance accessible to the asset owner is shown. System 100 uses any combination of mobile devices and remote sensor that are active to collect data of interest and report that data back to a central repository or repositories associated with the type of data or asset owner. The devices or sensor may be fixed or mobile and collect any type of data. The devices or sensors can then report the collected data using a variety of communications networks. For example, devices 101 are designed and used in an application requiring use of satellite network 104 for communications and data reporting, while devices 102 are used in an application where the preferential mode of communication is by cellular network, and devices 103 make use of wireless network 108. Devices 101 may be operated in very remote location without access to any network other than a satellite network, while device 102 may be mobile devices or devices at locations that are able to take advantage of the cellular network, and devices 103 may be devices that have access to a fixed infrastructure that allows the use of wireless networking capabilities. While particular examples of communications networks have been described, any other type of communications network could also be used without departing from the scope of the invention.

The devices 101, 102 and 103 use their associated network to communicate with data collection center 107. The devices 101, 102 and 103 can collect any type of data including environmental conditions status of a monitored asset, location of a monitored asset, or any other collectable data. Location determination mechanisms can be a GPS receiver communicating with the GPS satellite network, or can be cellular network location services that use the cellular network to determination location, or can be a combination of the two networks or any other location determination system.

The data collection center 107 receives continuous or periodic updates from the devices, allowing data collection center 107 to track large numbers of remote devices or sensors. Traditionally, the data collection center data could be used to generate reports for the owners or users of the remote data and those reports would be periodically run and sent to the asset owner 110 over a medium such as the Internet 106. In some applications or at the preference of the owners of the devices or sensors, however, it is preferable to have the data stored locally to the asset owner. Data appliance 109 received the data, raw or processed, from the data collection center and stores the data inside the asset owner's network or within the asset owner's control.

Figure 2:
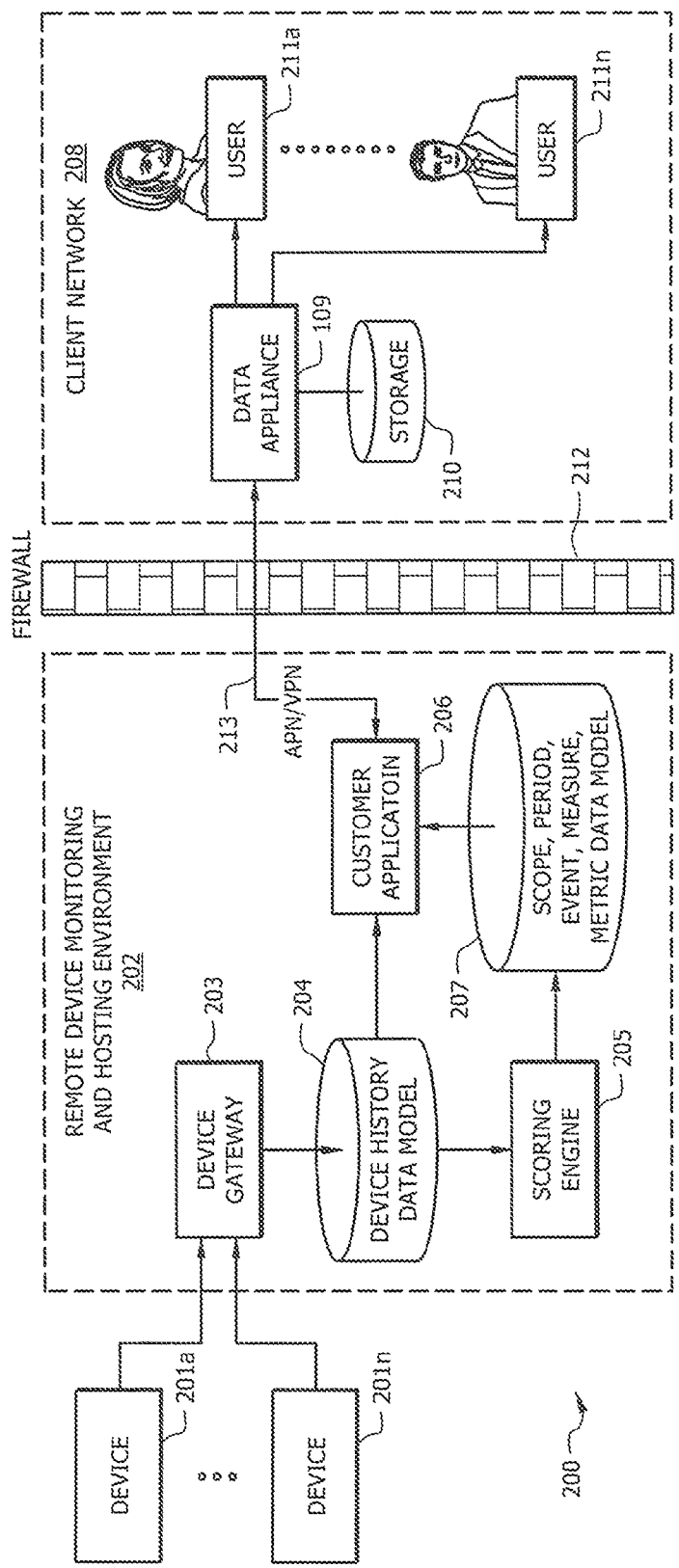
FIG. 2 is a block diagram of a data aggregation and analytical scoring engine for a system incorporating a local data appliance according to the concepts described herein.

Referring now to FIG. 2, system 200 shows a system that can be utilized for data aggregation and analytical scoring system employing a data appliance according to the concepts described herein. The system includes a device communications gateway 203 in a hosting environment 202 of the data collection center 107 from FIG. 1 that receives messages from remote devices 201a through 201n over various communications networks, which can include low earth orbit (LEO) satellite (for example, OrbitOne/GlobalStar), GPRS or radio frequency (RF) wireless networks, and/or general IP networks (such as the Internet), as described above.

The device gateway 203 parses messages based on device/network type to extract encoded data that can be unique for each of the devices. This can include any type of information and may include location information such as latitude/longitude where the device was located when the data was collected. Device gateway 203 inserts extracted device data into a processing queue for delivery to a device history data model 204, including the identity of the device reporting and both the time when the device recorded its data and the time when the gateway received the data called a reading (referred to as timestamps). The time of data collection and data receipt by the system may be different and such differences can influence the scoring process.

The device history data model 204 can maintain the population of devices 201a through 201n that can report data, including the network over which it can communicate and its unique identity on that network. The device history data model 204 also maintains a history of readings received from each device and maintains properties for each device. Combinations of devices can define one or more sub-populations, or "scopes," against which devices may be scored based on their historical readings. The device history data model receives readings queued up by device gateway for availability to the scoring engine.

The scoring engine 205, using the scoring engine database 207, maintains the definition of one or more scopes, wherein each scope defines a set of properties that identify a set of devices, a starting period (date/time) when scoring should begin, the duration of the period for which scoring will be performed (e.g., 1 week, 1 month), and other configurable aspects of how a score should be calculated (e.g., should "night" be considered to be 6 PM-6 AM local time or should it be between sundown and sunset for the latitude/longitude location where the reading was recorded).

The scoring engine 205 also maintains in the scoring engine database 207 a set of "scope events." Each scope event records a period that has been considered in the scoring process for each scope and a set of "scope metrics" that have been calculated for the given scope/period combination. Each scope metric captures the results of the scoring process for a specific device in the scope for a given period. The scoring engine 205 maintains a set of "device measures," each device measure utilized to capture customizable aggregate statistics of data from all readings for each device for a specific period start and duration. This data is collected for all "scorable" devices and is independent of any scope.

Scoring engine database 207 also can be configured to store a set of periods across all scopes, scope events, scope metrics, and device measures that have been encountered in the course of processing data from the device history data model. The scoring engine is operable to process readings for all "scorable" devices to create device measures for each period that has passed after an appropriate waiting period based on the possibility of known variances in the timestamps that can occur for the population of devices. Scoring engine 205 then can create scope events whenever all device measures have been created corresponding to a scoring period (start/duration) defined for a scope, and can create scope metrics for newly created scope events. This can be done by collecting all the device measures for the devices of a scope and applying a customizable scoring evaluation function that can be configured according to algorithms or parameters selected by each user or customer. The results of this evaluation function are stored in customizable attributes of each scope metric.

A customer application 206 is used to make customer data available to end-user customers. The customer application 206 can be configured to connect to a data appliance 109 in a customer's network 208. The data appliance 109 would preferably be connected through the customer firewall through VPN/APN connection 213. The data appliance can have internal storage, external storage 210 or a combination thereof. Customer users 211a through 211n can connect to the data appliance 109 over the customer's network 208 to gain access to the data and/or analysis stored on the data appliance 109. A system according to the concepts described herein provides the customer with a robust, physical server in their facility that is the final repository for their data that can include redundant power and redundant data storage. The system provides a flexible platform for hosting customized integration scripts to pull or push data to and from customer systems and the remote devices 201a through 201n in the field.

Figure 3:
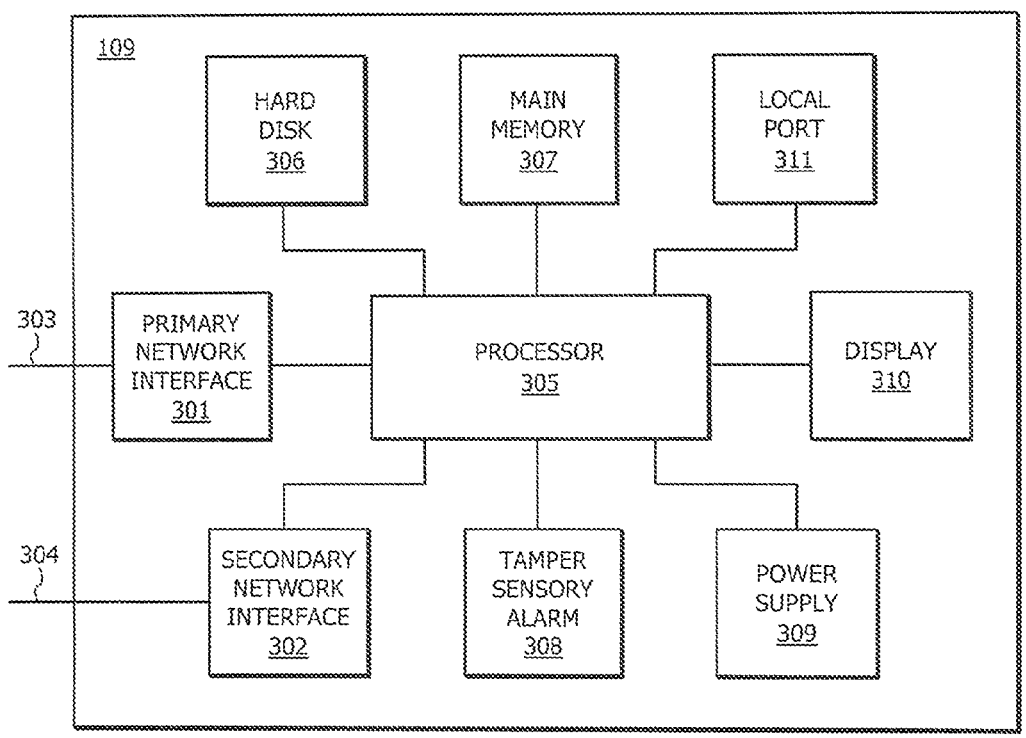
FIG. 3 is a block diagram of an embodiment of a local data appliance according to the concepts described herein.

Referring now to FIG. 3, a data appliance 109 according to the concepts set forth herein is described. The appliance 109 includes many of the same components as a traditional server, such as one or more processors 305, each of which may include multiple cores, memory 307, one or more hard disk drives 306, one or more network interfaces 301, 302 connected to network lines 303 and 304, respectively, and a power supply 309. In addition, the appliance may include a display 310 which might be a small LCD display and may or may not include touch screen functionality, a tamper sensor/alarm 308 to prevent tampering or moving the appliance, and a local port 312 that can be used to directly access the appliance for testing, updating, configuration, or data purposes.

In preferred embodiments, the data appliance can include an archive of data received from the customer device, and can be installed either in pairs at a single location or can be installed at multiple locations to provide hot-standby redundancy. The data appliance can be programmed to receive periodic software updates through remote configuration management services. The data appliance can be programmed to allow customers to "pull" data from the data appliance or the remote devices through the data appliance, and to allow customers to "push" data to any other systems that use or require the data. The data appliance can maintain logs of all these interactions to allow for audits and error tracking within the customer's systems.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An appliance for receiving and storing customer data collected from remote monitors and sensors, the appliance comprising:
    one or more network interfaces, the network interfaces operable to allow the appliance to communicate with a data collection center outside of an internal network of the customer;
    at least one processor connected to the one or more network interfaces, the processor operable to process the customer data and to control operation of the appliance;
    a data storage medium connected to the processor, the data storage medium storing the customer data; and
    an analytical scoring engine application run by the appliance;
    wherein the customer data is first collected from the remote monitors and sensors by the data collection center and then sent from the data collection center to the appliance, the appliance operable to process the customer data, generate reports based on the data and send instructions to the remote monitors and sensors, and to pull data from and push data to the remote monitors and sensors, and wherein the appliance resides behind the customer's firewall but is separate from the customers network and data center equipment.

2. The appliance of claim 1 further comprising tamper sensors to prevent tampering with the appliance.

3. The appliance of claim 1 wherein the appliance is connected to the data collection center using a virtual private network.

4. The appliance of claim 1 wherein the remote monitors and sensors report the customer data using a cellular network.

5. The appliance of claim 1 wherein the remote monitors and sensors report the customer data using a satellite network.

6. The appliance of claim 1 wherein the remote monitors and sensors report the customer data using a wireless networking network.

7. The appliance of claim 1 wherein the appliance executes customized integration scripts to pull data from and push data to the remote monitors and sensors.

8. The appliance of claim 1 further comprising a display.

9. The appliance of claim 1 wherein the appliance can receive periodic software updates from the data collection center using remote configuration management services.

10. A system for providing local access to data collected from remote monitors and sensors, the system comprising:
    a plurality of remote monitors and sensors, the remote monitors and sensors reporting data over a wide area communications network;
    a data collection center outside a customer network receiving the data from the remote monitors and sensors, the data collection center operable to process the data and generate customer defined reports based on the data; and
    a local data appliance in the customer network that includes an analytical scoring engine application run by the appliance, the local data appliance receiving the data from the data collection center, and operable to process the customer data, generate reports based on the data, send instructions to the remote monitors and sensors, and to pull data from and push data to the remote monitors and sensors, and wherein the appliance resides behind the customer's firewall but is separate from the customers network and data center equipment.

11. The system of claim 10 further comprising tamper sensors to prevent tampering with the appliance.

12. The system of claim 10 wherein the appliance is connected to the data collection center using a virtual private network.

13. The system of claim 10 wherein the remote monitors and sensors report the customer data using a cellular network.

14. The system of claim 10 wherein the remote monitors and sensors report the customer data using a satellite network.

15. The system of claim 10 wherein the remote monitors and sensors report the customer data using a wireless networking network.

16. The system of claim 10 wherein the appliance executes customized integration scripts to pull data from and push data to the remote monitors and sensors.

17. The system of claim 10 further comprising a display.

18. The system of claim 10 wherein the appliance can receive periodic software updates from the data collection center using remote configuration management services.

* * * * *